United States Patent Office 3,637,593
Patented Jan. 25, 1972

3,637,593
PROCESS FOR SEPARATING POLYPHENYLENE
OXIDES
Hans-Dieter Becker, Gothenburg, Sweden, and Alfred
R. Gilbert, Schenectady, N.Y., assignors to General
Electric Company
No Drawing. Filed July 9, 1970, Ser. No. 53,649
Int. Cl. C08g 23/18
U.S. Cl. 260—47 ET
6 Claims

ABSTRACT OF THE DISCLOSURE

Diphenoquinones present in polyphenylene oxides as a result of oxidation of diorganophenols can be separated from the polyphenylene oxides as biphenols by treatment of the mixture of the polyphenylene oxide and the diphenoquinone with a hydrogen halide.

Process for separating polyphenylene oxides

This invention is concerned with a process for isolating polyphenylene oxides from reaction mixtures containing the same. More particularly, the invention relates to a process for separating formed polyphenylene oxide from the tetraorgano-substituted diphenoquinone (hereinafter referred to as "diphenoquinone") present in the reaction product containing the polyphenylene oxide as a result of oxidizing a diorganophenol of the general formula (I)

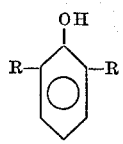

in the presence of an amine-basic cupric salt complex, which process comprises treating the polyphenylene oxide reaction product containing the diphenoquinone with a hydrogen halide of the formula (II)        HX to convert the diphenoquinone to a halobiphenol, and thereafter separating the polyphenylene oxide from the biphenol, where R is a monovalent hydrocarbon radical of from 1 to 6 carbon atoms and X is a member of the class of chlorine, bromine and fluorine.

U.S. Pats. 3,306,874 and 3,306,875 obtained in the name of Allan S. Hay, issued Feb. 28, 1967 and assigned to the same assignee as the present invention, describe the preparation of polyphenylene oxides by the oxidation of phenols of Formula I with oxygen in the presence of an amine-basic cupric salt complex. The details for preparing polymers of this type are more particularly described in the above-identified patents which by reference are made part of the disclosures and teachings of the instant application.

As a result of carrying out the oxidation reaction of the diorganophenol in the presence of the above-described catalyst system, there are obtained polyphenylene oxides (hereinafter so designated) of the general formula (III)

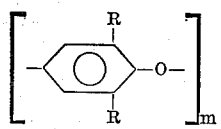

where R has the values recited previously, and m is a whole number in excess of 1, e.g., 10 to 10,000 or more. The reaction product thus derived ordinarily is obtained in the form of an aromatic hydrocarbon solution, such as a toluene solution, the toluene being generally the solvent in which the reaction is carried out. The reaction product also contains small amounts of unreacted amine catalyst, the copper salt, and small amounts ranging from 0.5 to 5%, by weight, based on the weight of the total polymer, of a diphenoquinone of the general formula (IV)

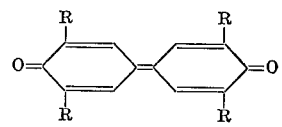

where R has the meaning above.

Because of the presence of other ingredients in the effluent resulting from the oxidation reaction, it has been the practice in the past to process the effluent reaction product (i.e. the product derived from carrying out the oxidation reaction) in such a manner as to aim at isolation of the pure polyphenylene oxide by separating of the diphenoquinone and ultimate discarding of the diphenoquinone. This has usually been the case because of excessive contamination of the diphenoquinone with the other ingredients resulting from the reaction, and because of the difficulty with which the diphenoquinone can be isolated from such mixtures, particularly removing the last traces of the diphenoquinone from the polyphenylene oxide. If the diphenoquinone is not removed essentially completely, the isolated polyphenylene oxide will have a yellowish cast, whereas for many applications it is desired that the polyphenylene oxide be colorless and water-white. Although the diphenoquinone per se has useful properties, because of the cost of separating the diphenoquinone from the effluent reaction product, little if any attempt has been made in the past to isolate the diphenoquinone.

Even though the diphenoquinone is destined for ultimate discard by present procedures for isolating the more desired polyphenylene oxide polymer, numerous processing steps and expensive solvents are still required to remove the diphenonquinone and to obtain pure polyphenylene oxide thus adding to the cost required to obtain a polyphenylene oxide of desired purity. For instance, part of the processing technique required to separate or remove the diphenoquinone involves the use of large amounts of an expensive solvent for the diphenoquinone, such as methanol, to separate the diphenoquinone from the polyphenylene oxide.

Unexpectedly, we have discovered that we can treat the effluent reaction product derived from the oxidation of the diorganophenol in the presence of the amine-basic cupric salt complex, with a gaseous hydrogen halide whereby the diphenoquinone is converted to the corresponding monohalobiphenol of the general formula (V)

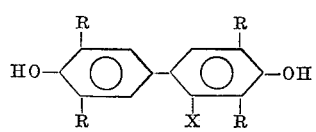

where R and X have the meanings above. As a result of this treatment with the hydrogen halide, the polyphenylene oxide can be more readily and more economically isolated by fewer steps, while at the same time the diphenoquinone is removed in the form of the above-identified biphenol which in turn can be isolated without using expensive solvents (which need additional processing to recover because of their cost) and in essentially the pure form. This biphenol can be used in other applications, for instance, as an intermediate in the preparation of various polyesters, polycarbonates, etc., useful in the plastics art. As a result of being able to remove essentially all the diphenoquinone from the polyphenylene oxide, the final polymer is essentially colorless as contrasted to a polymer having a slightly yellowish cast usually produced by prior manufacturing procedures.

This simple procedure for separating the diphenoquinone from the polyphenylene oxide should be contrasted with the more complex process which is often employed for isolating the polyphenylene oxide. More particularly, the polyphenylene oxide reaction product resulting from the oxidation process generally comprises the polyphenylene oxide in a solvent in which the reaction is carried out and includes the amine-cupric salt complex, the water resulting from the oxidation step, and a small amount of methanol (about 1%, by weight, of the total reaction product) added to solubilize the copper salt. The reaction product is orinarily diluted with additional aromatic hydrocarbon solvent, such as the aforementioned toluene, so that the concentration of the polyphenylene oxide ranges between 8 to 10%, by weight. Thereafter, a small amount of acetic acid is added in order to remove the amine used in the catalyst system and in order to assist in precipitation of the cupric salt in the methanol. This leaves behind the toluene solution of the polyphenylene oxide in combination with the diphenoquinone. Thereafter, large amounts of methanol are added to this solution to extract the diphenoquinone. It is usually customary to recover methanol leaving behind a sludge containing the diphenoquinone which is discarded. As can be readily seen, not only are there a number of steps and expensive solvents required in order to obtain a pure polyphenylene oxide, but because of the sludge characteristics in which the diphenoquinone comes down, it ordinarily does not pay to isolate the diphenoquinone and this is usually discarded with concurrent economic loss.

In the practice of our invention, one adds the hydrogen halide, preferably gaseous hydrogen chloride, to the diluted polyphenylene oxide effluent reaction product (about 8 to 10% polyphenylene oxide solids) to yield a a solution of the polyphenylene oxide combined with the formed biphenol, which solution is generally colorless (in contrast to the sludgy, dark-colored product obtained in the usual processing steps). There is also separated from the polymer solution containing the biphenol, another phase which is composed of a solution of the amine and the cupric salt. Thereafter, the mixture of the polymeric solution containing the biphenol is treated with an aqueous base, such as an aqueous solution of sodium hydroxide, which will convert the chlorobiphenol to the sodium salt. Thereafter, by steam distillation (without any need for a solvent, such as methanol), the sodium salt can be removed leaving behind essentially pure polyphenylene oxide in almost a colorless state. The amount of alkali-metal hydroxide used is at least stoichiometrically used to the molar concentration of the chlorobiphenol. After removal of the solvent, the polyphenylene oxide iself is obtained in essentially a pure colorless form ready for commercial usage.

It is also possible to treat the effluent reaction product with the hydrogen halide at a point normally employed for polymer purification in the prior processing techniques, i.e., where the acetic acid has been added to the effluent to precipitate the amine, most of the acetic acid, and the cupric salt in combination with the methanol. At this point, by treating the remainder of the effluent reaction product (which comprises mostly the solvent, such as toluene, the polyphenylene oxide, and the diphenoquinone) with the hydrogen halide, again one obtains a phase composed of the toluene, the polyphenylene oxide, and the formed biphenol which is essentially a colorless solution in which the polyphenylene oxide is also essentially colorless. By treating this solution with the aqueous base, the aqueous solution of the sodium salt of the biphenol separates leaving the organic solvent solution of the essentially pure polyphenylene oxide. The solvent can readily be removed from the polyphenylene oxide. By acidification of the aforesaid sodium salt, the chlorobiphenol itself is obtained.

Among the hydrogen halides which may be employed are, for instance, hydrogen chloride, hydrogen bromide, etc. Preferably, the hydrogen halide is used as a hydrogen halide gas, although it may be added in the form of an aqueous solution of various concentrations preferably within the range of about 15 weight percent to the concentrated aqueous hydrogen halide state, for instance, hydrogen chloride such as 37% concentration. The amount of hydrogen halide used can be varied widely and is not critical. Thus, the hydrogen halide gas can be bubbled into the solution of the effluent reaction product with enough of the hydrogen halide being used to insure that stoichiometric amounts of the hydrogen halide have reacted with all the diphenoquinone present to form the corresponding monohalobiphenol. Excess hydrogen halide is not detrimental. Alternatively, the aqueous hydrogen halide solution can be added slowly with stirring to the polyphenylene oxide effluent reaction product again employing an amount equal to at least the stoichiometric amount of hydrogen halide required to form the corresponding monohalobiphenol.

The temperature at which the hydrogen halide addition is carried out is not critical but generally room temperatures are satisfactory for the purpose. However, temperatures as low as, for instance, 20° C. and temperatures above room temperature can be employed especially where it is desired to increase the rate of reaction of the hydrogen halide with the diphenoquinone to cause formation of the corresponding biphenol. Thus, temperatures as high as 50° to 125° C. may be used without departing from the scope of the invention. The rate of addition of the hydrogen halide can be varied widely. Rates of from 150 to 1200 ml./minute/pound polymeric effluent can advantageously be employed.

In order that those skilled in the art may better understand how the present invention may be practiced, the following examples are given by way of illustration and not by way of limitation.

EXAMPLE 1

A polyphenylene oxide was prepared as follows. About 192 grams of a 50 weight percent toluene solution of 2,6-dimethylphenol was charged into a kettle equipped with a stirrer. Thereafter, a solution of 0.5 gram $CuBr_2$ in 10 ml. methanol and 22 ml. dibutylamine, and 745 ml. toluene were added at room temperature (25–30° C.). While the solution was stirred vigorously, oxygen was introduced into the solution over a period of 90 minutes at a rate of 1.0 cu. ft. for the first 60 minutes and 0.25 cu. ft. for the remaining 30 minutes. At the end of this time, a brown-yellow solution was obtained containing a considerable amount (up to 5 weight percent, based on the weight of the polyphenylene oxide) of insoluble 3,3′,5,5′-tetramethyl-diphenoquinone (TMDQ). This mixture, which was diluted to form about a 9% solids solution in toluene, will hereinafter be referred to as "polymeric effluent."

EXAMPLE 2

The following example illustrates one method which has been used in the past to isolate the poly(2,6-dimethyl-1,4-phenylene) oxide. More particularly, 100 ml. of the above polymeric effluent comprising the polyphenylene oxide, TMDQ, water, and the catalyst system was treated with 8.7 ml. of 20% aqueous acetic acid to form the acetate of the dibutyl amine, thus permitting removal of the latter material. It might be well to point out that one disadvantage of using acetic acid is that once the acetic acid is added, the polymer must be processed promptly because if this is not done, the polymer tends to degrade to a lower molecular weight state. After addition of the acetic acid, the toluene solution separated into an upper phase and a lower phase containing the catalyst system and a sizable quantity of the TMDQ as a sludge-like residue. The upper phase which contained the polyphenylene oxide and the remaining TMDQ was separated from the lower phase and the polymer in the upper phase was precipitated by stirring into 400 ml. methanol; the diphenoquinone at this concentration remained dissolved in this solvent and was thus separated from the polymer. The precipitated polymer was washed with 600 ml. methanol to remove as much as possible of any residual TMDQ, and dried. The intrinsic viscosity of the material (measured in $CHCl_3$ at 25° C.) was 0.61. The polymer had a slightly yellowish cast to it, due to incomplete removal of TMDQ. The residual methanol-toluene solution containing the TMDQ was discarded.

The following example illustrates the method for treating the crude polymeric effluent in accordance with the present invention. More particularly, 100 ml. of the aforesaid polymeric effluent, to which is added 4-6 ml. methanol, is treated by bubbling in HCl gas at a rate of about 150 to 180 ml./min. for approximately 8-10 minutes while stirring the effluent. It will be noted that the solution will change from the dark color associated with the polymeric effluent in a matter of 2-3 minutes to a lighter color, and within 8-10 minutes of HCl treatment, the solution turns to a light yellow having a dark brown phase containing the catalyst system which will separate as a lower heavy layer. Thereafter, the effluent upper layer is removed and then treated with a 1% (by weight) aqueous solution of sodium hydroxide in an amount in excess of that required to form the disodium salt of the 3-chloro-2,2',6,6'-tetramethyl-p,p'-biphenol which is present in combination with the polyphenylene oxide as a result of the HCl treatment. The amount of the sodium hydroxide solution is at least that required to react stoichiometrically with the chlorobiphenol present in the polyphenylene oxide solution. The two phase system thus obtained comprises a lower aqueous phase of the sodium needed to work up the desired polyphenylene oxide and recovery of materials used in the process are either significantly reduced or eliminated. This all leads to a more economical and more efficient method for obtaining polyphenylene oxides having a better color factor than those obtained by the usual methods employed for isolation of polyphenylene oxides.

Although the aforementioned two Hay patents describe the various diorganophenols which can be employed in his process and the corresponding polyphenylene oxide formed therefrom, we have found that our process is particularly adaptable to treatment of polyphenylene oxides which are derived from diorganophenols, such as 2,6-dimethylphenol, 2,6-diphenylphenol, 2-methyl - 6 - phenylphenol, etc. It will be apparent that from these diorganophenols one obtains the corresponding polyphenylene oxides of Formula III. Thus, in Formulas I and III, R can be methyl, phenyl, ethyl, propyl, butyl, t-butyl, etc.

It should be recognized that the above-mentioned two Hay Pats. 3,306,874 and 3,306,875 give numerous examples of cupric halide, amines, and diorganophenols and conditions required to give the desired polyphenylene oxide and uses of such polymers and, therefore, it is not believed necessary to repeat the various ingredients which are required to form the desired polyphenylene oxide. By reference, these various materials and conditions, as well as the uses to which the polyphenylene oxides can be put are made part of the disclosures and teachings of the instant application. As will be further recognized, a particular diorganophenol will form the corresponding polyphenylene oxide and the corresponding tetraorgano-substituted diphenoquinone. Typical examples of such products are found in the following table:

TABLE 1

| Starting diorganophenol | Polyphenylene oxide | Diphenoquinone |
|---|---|---|
| 2,6-dimethylphenol | $\left[ -\underset{CH_3}{\underset{|}{\overset{CH_3}{\overset{|}{\bigcirc}}}}-O- \right]_m$ | $O=\underset{CH_3}{\underset{|}{\overset{CH_3}{\overset{|}{\bigcirc}}}}=\underset{CH_3}{\underset{|}{\overset{CH_3}{\overset{|}{\bigcirc}}}}=O$ |
| 2,6-diphenylphenol | $\left[ -\underset{C_6H_5}{\underset{|}{\overset{C_6H_5}{\overset{|}{\bigcirc}}}}-O- \right]_m$ | $O=\underset{C_6H_5}{\underset{|}{\overset{C_6H_5}{\overset{|}{\bigcirc}}}}=\underset{C_6H_5}{\underset{|}{\overset{C_6H_5}{\overset{|}{\bigcirc}}}}=O$ |
| 2-methyl-6-phenylphenol | $\left[ -\underset{C_6H_5}{\underset{|}{\overset{CH_3}{\overset{|}{\bigcirc}}}}-O- \right]_m$ | $O=\underset{C_6H_5}{\underset{|}{\overset{CH_3}{\overset{|}{\bigcirc}}}}=\underset{C_6H_5}{\underset{|}{\overset{CH_3}{\overset{|}{\bigcirc}}}}=O$ | salt, and an upper colorless toluene phase containing essentially pure polyphenylene oxide. The alkali-metal salt phase is separated and the remaining toluene solution phase containing the poly(2,6-dimethylphenylene-1,4) oxide, after washing with water, is treated (e.g., by steam precipitation) to yield the essentially pure water-white polymer. The alkali-metal salt of the chlorobiphenol thus obtained can be acidified, for instance, with hydrogen chloride to yield the 3-chloro-2,2',6,6'-tetramethyl-p,p'-biphenol.

The production of such a colorless product is due almost entirely to the essentially complete removal of the diphenoquinone by means of the hydrogen chloride treatment. It will be found that the intrinsic viscosity of the polyphenylene oxide thus obtained is essentially the same as the intrinsic viscosity of the polyphenylene oxide prepared by the acetic acid process described above. It will also be recognized that no expensive solvents are needed to remove the diphenoquinone, such as the methanol normally employed, and the number of processing steps where $m$ is greater than 1, e.g., 10 to 10,000 or more.

Typical of the halobiphenols which may be obtained as a result of treating the corresponding polyphenylene oxide with the hydrogen halide may be mentioned, in addition to the 3-chloro - 2,2',6,6' - tetramethyl-p,p'-biphenol, for instance, 3-chloro-2,2',6,6'-tetraphenyl-p,p'-biphenol (from the oxidation of 2,6-diphenylphenol), 3-chloro - 2,2' - dimethyl - 6,6' - diphenyl-p,p'-biphenol, etc. Where hydrogen halides other than hydrogen chloride are employed, instead of obtaining the chlorobiphenol derivative, one would obtain the corresponding bromo, fluoro, etc. derivative.

It will of course be apparent to those skilled in the art that instead of treating the polymeric effluent derived from the oxidation of 2,6-dimethylphenol, one can also treat the effluent from the oxidation of 2,6 - diphenylphenol, 2-methyl-6-phenylphenol, etc. In addition, instead of using gaseous hydrogen chloride, one can also employ gaseous hydrogen bromide, gaseous hydrogen fluoride, etc., in the same manner as the preceding examples in order to obtain the corresponding halobiphenol and effect complete and more convenient separation of the formed polyphenylene oxide. Obviously the conditions of reaction for treatment with the hydrogen halide can be varied widely as is mentioned previously, all within the scope of the invention.

What we claim as new and desire to secure by Letters Patent of the United States is:

1. In the process for making a polyphenylene oxide of the general formula

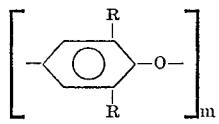

from a diorganophenol of the general formula

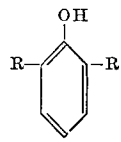

by the oxidation of the aforesaid diorganophenol, the improvement for separating the formed polyphenylene oxide from the tetraorgano-substituted diphenoquinone present in the reaction product, which comprises treating the reaction product containing the diphenoquinone with a hydrogen halide of the formula HX to convert the diphenoquinone to a halobiphenol, converting the halobiphenol to an alkali-metal salt, and thereafter separating the alkali-metal salt of the halobiphenol from the polyphenylene oxide, where R is a monovalent hydrocarbon radical of from 1 to 6 carbon atoms, X is a member of the class of chlorine, bromine, and fluorine, and $m$ is a whole number in excess of 1.

2. The process as in claim 1 in which the diorganophenol is 2,6-dimethylphenol.

3. The process as in claim 1 in which the diorganophenol is 2,6-diphenylphenol.

4. The process as in claim 1 in which the hydrogen halide is hydrogen chloride.

5. The process as in claim 1 in which the diorganophenol is 2,6-dimethylphenol and the hydrogen halide is hydrogen chloride.

6. The process as in claim 5 in which the hydrogen chloride is added in the form of gaseous hydrogen chloride.

References Cited
UNITED STATES PATENTS
3,306,875   2/1967   Hay.

MELVIN GOLDSTEIN, Primary Examiner